United States Patent Office 2,828,643
Patented Apr. 1, 1958

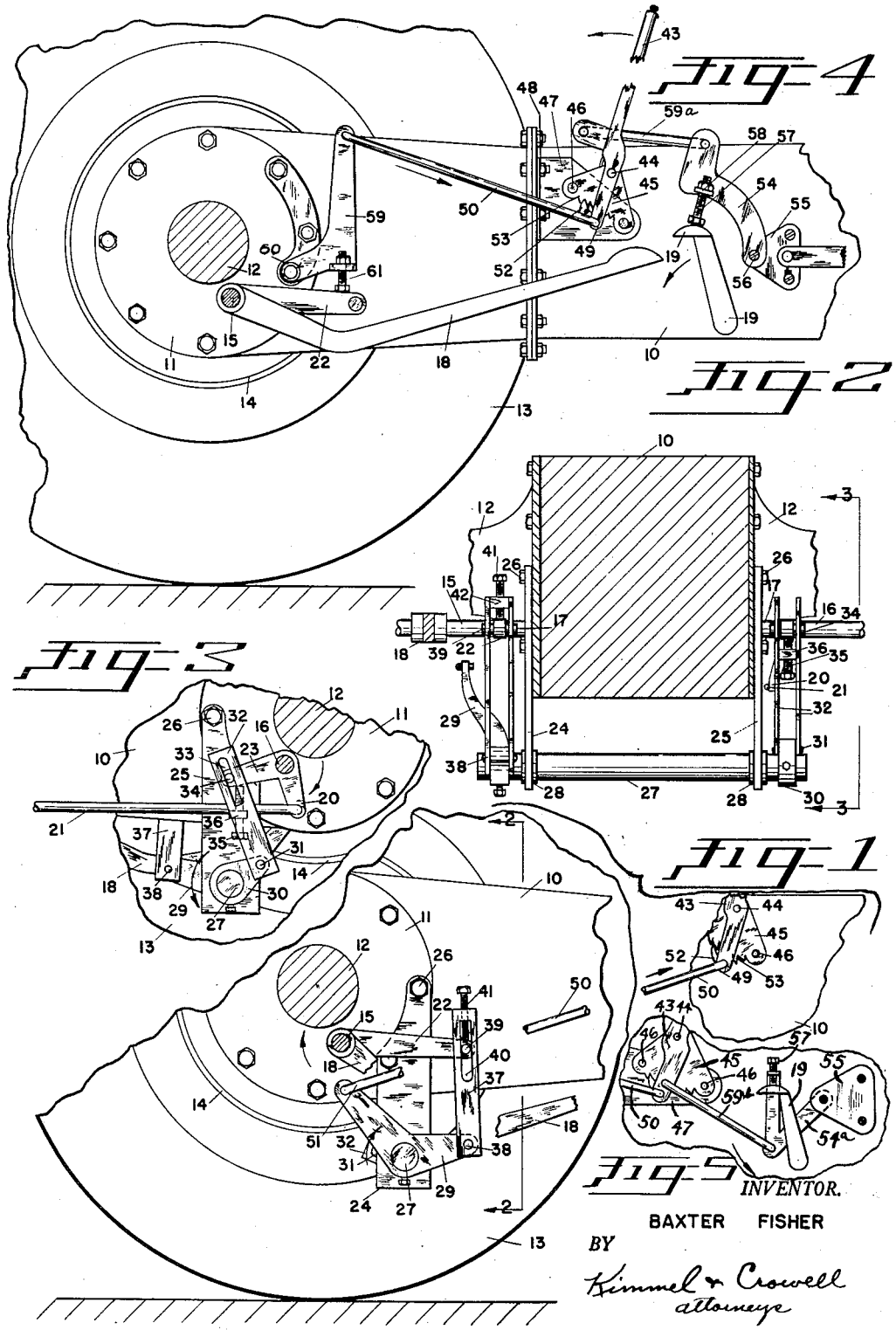
April 1, 1958 — B. FISHER — 2,828,643
EMERGENCY BRAKES FOR TRACTORS
Filed March 14, 1956
INVENTOR.
BAXTER FISHER
BY Kimmel & Crowell
attorneys

2,828,643

EMERGENCY BRAKES FOR TRACTORS

Baxter Fisher, Springfield, Oreg.

Application March 14, 1956, Serial No. 571,460

3 Claims. (Cl. 74—481)

This invention relates to emergency brakes for tractors and is particularly adapted to be used in connection with farm tractors.

The primary object of the invention is to provide an emergency brake that is adapted to fit farm tractors, of the type wherein no emergency brake is provided.

In certain farm tractors only foot control brakes are provided for braking the tractor, other than the transmission, and the present invention is intended as an attachment to such tractors to provide an emergency brake.

Other objects and advantages will become apparent in the following specification when considered in the light of the attached drawings, in which:

Figure 1 is a fragmentary side view of the invention shown attached to a tractor with parts broken away and in section.

Figure 2 is a sectional view, taken through the tractor on the line 2—2 of Figure 1, looking in the direction indicated, showing how the mechanism is attached thereto.

Figure 3 is a fragmentary side view from the opposite side of the tractor and brake applicator than that shown in Figure 1, taken on the line 3—3 of Figure 2, looking in the direction indicated.

Figure 4 is a fragmentary side elevation modified form of emergency brake applicator wherein one of the brake operating shafts is operated from a special lever fixed to the shaft, while the opposite brake is operated through the present brake control pedal by the brake applicator.

Figure 5 is a fragmentary side elevation of a modified linkage arrangement for the brake operator illustrated in Figure 4.

Referring now to the drawings in detail wherein like reference numerals indicate like parts throughout the several figures, the reference numeral 10 indicates generally the body of a tractor having as usual a differential housing 11. Axles 12 extend from the differential housing 11 and carry wheels 13 thereon with the usual brake drums 14 associated therewith. Brake applicator rods 15 and 16 extend from bearings 17 associated with the differential housing 11 into the brake drums 14 of the wheels 13.

The present brake applicator mechanism conventionally applied to some farm tractors consists of foot pedals 18 and 19 which apply the brakes through the rods 15 and 16. The foot pedal 18 is keyed directly to the shaft 15 while the foot pedal 19 is journalled through the tractor body 10 and is connected to the shaft 16 by way of a lever 20 and connecting rod 21. The lever 20 and the rod 21 are best illustrated in Figure 3. Referring to Figures 1, 2 and 3, levers 22 and 23 are fixedly secured to the brake operating shafts 15 and 16, respectively.

This new and improved emergency brake applicator attachment consists of providing brackets 24 and 25 which are secured to the differential housing 11 by bolts 26. A transverse counter shaft 27 is journalled within bearings 28 on the brackets 24 and 25 on opposite sides of the body 10. Keyed to one end of the shaft 27, as viewed in Figure 1, is a bell crank 29 and keyed to the other end as seen on the opposite side in Figure 3, is a lever 30.

Pivotally connected at 31 to the outer end of the lever 30 is a pair of connecting links 32. The links 32 have slots 33 formed therein which ride on a pivot pin 34. The pin 34 is fixedly secured to the outer end of the lever 23. The lever 23 is keyed to the brake operating shaft 16 to rotate the shaft 16 in a manner to be described later on.

An adjustable set screw 35 is threaded within a bracket 36 joined to and extending between the links 32 to adjust the setting up of the brake by positioning the lever 23 in reference to the links 32.

Referring to Figure 1, a pair of links 37 are pivotally connected to the bell crank 29 at 38 at their lower end, and to the pivot pin 39 forming part of the lever 22 by way of slots 40. A set screw 41 is threaded into a cross member 42, as best illustrated in Figure 2, coming down against the end of the lever 22. This also provides a means of adjusting the brake.

A hand operating brake lever 43 is pivotally connected at 44 to a quadrant 45, which in turn is fixedly secured at 46 to a bracket 47. The bracket 47 is bolted to the body 10 by bolts 48. The lower end 49 of the brake operating lever 43 has a connecting rod 50 pivotally connected thereto at its one end, while the opposite end of the rod 50 is pivotally connected to the bell crank 29 at 51. A pawl 52 is pivotally connected to the lower end 49 of the lever 43 so as to engage the quadrant teeth 53.

Referring to Figure 4, a modified form of brake applicator is disclosed wherein a lever 54 is pivotally secured to a bracket 55 at 56. The bracket 55 is already a part of the tractor body 10. A set screw 57 is threaded to a bracket 58 on the lever 54 and is adapted to contact the foot pedal 19 for moving the brake pedal 19 so as to rotate the brake operating rod 16 by the connecting rod 21 and the lever 20, which is already part of the tractor. The lever 54 is operated from the hand brake lever 43 by way of the connecting rod 59a, as illustrated in Figure 4.

In the operation of the preferred form of embodiment illustrated in Figures 1, 2 and 3 by the operator pulling the lever 43 in the direction of the arrow, the connecting rod 50 will pull the bell crank 29 in the direction of the arrow rotating the shaft 27 so as to pull downwardly on the links 37, set screw 41 on the upper surface of the crank 22 rotating the brake operating shaft 15 in the direction of the arrow and applying the brake on the right hand wheel.

In the revolving of the shaft 27, the lever 30 will be revolved in the direction of the arrow, Figure 3, so as to lift the links 32, set screw 35 against the end of the lever 23 rotating the brake shaft 16 in the direction of the arrow and applying the brake to the left hand wheel of the tractor. By the adjusting of the set screws 41 and 35 the brakes can be equalized.

In the operation of the modified form shown in Figure 4, when the rod 50 is pulled by the lever 43 in the direction of the arrows it will rock the bell crank 59 which is pivotally mounted to the differential housing at 60. This will force the set screw 61 downwardly against the top of the lever 22 applying the brake on the right hand wheel.

When the lever 43 is pulled rearwardly it will pull the connecting rod 59a with the same, rocking the crank 54 about the pivot point 56 and causing the set screw 57 to engage the top of the pedal 19 rotating the same in the direction of the arrow and pulling on the link 21, referring to Figure 3, and applying the brake on the left hand side.

With the form used as shown in Figures 1, 2 and 3, the foot pedal 19, connecting rod 21 and lever 20 still remain in operating position, but when the foot pedal 19 is used the lever 23 will raise in regards to the links 32 without effecting them otherwise and will not effect the operation of the same when the emergency brake lever 43 is applied.

In the modification illustrated in Figure 5, the lever 54a is formed as a dogleg lever projecting downwardly from the bracket 55. The connecting rod 59b extends from the lowermost portion of the lever 54a directly to the brake lever 43. This form of the invention lowers the lever mountings where this arrangement is desirable and otherwise operates in the same manner as the modification illustrated in Figure 4.

Having thus described the preferred embodiments of the invention, it should be understood that numerous additional modifications and structural adaptations might be resorted to without departing from the scope of the appended claims.

What is claimed is:

1. An emergency brake attachment for farm tractors of the type having separately actuated foot controlled brakes on the opposite rear wheels including individual brake actuating shafts comprising a transverse shaft mounted beneath said tractor, a hand operated lever, a pivot mounting said lever to said tractor in spaced relation to said transverse shaft, link means connecting said hand operated lever to said shaft whereby movement of said lever on said pivot will rotate said shaft, a lever connected to each of said brake actuating shafts and extending laterally therefrom, each of said last named levers having a pivot pin integrally secured to the outer end thereof, and a pair of links operatively associated with said transverse shaft at one end thereof and means adjustably securing the opposite end of said last named links to said pivots.

2. A device as claimed in claim 1 wherein a rack quadrant is positioned adjacent said hand lever and a pawl is pivotally mounted to said hand lever for cooperation with said rack quadrant to lock said hand lever in adjusted position.

3. A device as claimed in claim 1 wherein said transverse shaft is mounted in a pair of oppositely disposed depending brackets mounted on said tractor and having transverse bearings extending therethrough for journalling said transverse shaft.

References Cited in the file of this patent
UNITED STATES PATENTS

| | | |
|---|---|---|
| 1,384,073 | Lee | July 12, 1921 |
| 1,595,523 | Oliver | Aug. 10, 1926 |
| 2,527,774 | Stieger | Oct. 31, 1950 |